United States Patent

[11] 3,632,288

| [72] | Inventors | Michal Niechwiadowicz;<br>Arnold B. Finestone, both of Leominster, Mass. |
|---|---|---|
| [21] | Appl. No. | 823,140 |
| [22] | Filed | May 8, 1969 |
| [45] | Patented | Jan. 4, 1972 |
| [73] | Assignee | Foster Grant Co., Inc.<br>Leominster, Mass. |

[54] PROCESS FOR DYEING STYRENE POLYMERS
12 Claims, No Drawings

[52] U.S. Cl..................................................... 8/4, 8/94,
8/175, 8/176, 8/41 D, 8/39, 8/149.1, 260/41 C,
260/33.6 UA, 260/2.5
[51] Int. Cl...................................................... D06p 3/00,
C08f 45/26
[50] Field of Search............................................ 8/4, 180,
175, 176, 94; 260/2.5, 41 C, 33.6 UA

[56] References Cited
UNITED STATES PATENTS

| 3,403,966 | 10/1968 | Itoh et al.................. | 8/4 |
| 3,467,481 | 9/1969 | Gold............................ | 8/4 |
| 3,478,024 | 11/1969 | Altermatt.................... | 260/248 |
| 3,399,025 | 8/1968 | Nicholson.................... | 8/4 |

*Primary Examiner*—Donald Levy
*Assistant Examiner*—B. Bettis
*Attorneys*—Leroy G. Sinn, Coleman R. Reap and Leonard S. Selman

ABSTRACT: Expandable styrene polymers in particulate form are suspended in aqueous medium and heated under pressure in the presence of a finely divided, water-insoluble, organic solvent-soluble dye and a high-boiling organic solvent in which the polymer is soluble.

3,632,288

PROCESS FOR DYEING STYRENE POLYMERS

BACKGROUND OF THE INVENTION

This invention relates generally to the dyeing of styrene polymer particles and more particularly relates to the preparation of dyed expandable styrene polymer particles in aqueous suspension at autogenous or superautogenous pressure by the use of an oil-soluble dye and an organic compound in which the dye and the polymer being treated are soluble, such as benzene or alkenyl, alkyl, or halogen substituted benzenoid compounds.

Expandable styrene polymers in particulate form are used for the production of a large variety of objects, such as drinking cups, toys, building panels, refrigerators, coolers, and freezers. The expandable styrene polymers used are in the form of granules, such as beads or pellets and contain an expansion or blowing agent in the amount of from about 3 to 15 parts by weight per 100 parts of polymers. Upon heating, the expandable polystyrene particles expand. Customarily, the particles are preexpanded by subjecting them to the action of steam. The preexpanded particles are blown into a mold and the mold is then heated so that the particles expand further and congeal to form a unitary object which takes the form of the mold. The manufacturer of the molded articles frequently desires that the finished product be colored. Heretofore, it has been difficult to produce expandable particles which contain a dye evenly and uniformly dispersed throughout the content thereof. The main difficulty has been to provide expandable styrene polymer particles which upon expansion do not have areas within the centers thereof which are not colored or which have a color lighter than the color of the outer areas of the particles. In other words, it has been difficult to provide a process by which the dye may be made to pass through the surfaces of the particles and diffuse into the interior areas thereof in even concentration so that upon expansion the particles are evenly colored throughout. It is desirable that the particles be evenly colored throughout because molded articles which are produced by the complete expansion of the preexpanded particles are often shaped by planing or milling and unless the particles are evenly dyed throughout, the planed or milled object has an undesirable, mottled appearance.

Attempts have been made to dye expandable styrene polymer granules by dry blending the granules with a dry dyestuff. This method has proved unsatisfactory however, because of the inability of the dye to penetrate into the granules; accordingly, when these granules are expanded they do not have a uniform color throughout their interior. The surface of the expandable styrene polymer granules appears to have a difficultly penetrable skin which impedes the impregnation of the dye into the interior of the granules. The Bianco U.S. Pat. No. 3,020,247, discloses an attempt to provide impregnation of dyes into the interior of expandable styrene polymer granules by dispersing, in an aqueous medium, the granules, a water-soluble, organic solvent-soluble dye, and one of certain organic solvents. This process has proved unsatisfactory, however, for several reasons. In the first place the temperature of the suspension bath has to be carefully controlled to prevent premature expansion of the beads. Due to prolonged dyeing time necessitated by the lower operating temperatures the products obtained by the Bianco process often do not have satisfactory expansion properties because of the loss of blowing agent. In addition to the above drawback these products do not have a uniform color throughout because of the inability of the dye to disperse uniformly throughout their interiors.

The Nicholson U.S. Pat., No. 3,399,025, discloses a method designed to prevent the loss of blowing agent in a dyeing process similar to Bianco's. This is accomplished by operating under elevated pressures, thereby preventing the loss of a substantial amount of the very volatile blowing agent. This patent discloses the use of certain organic penetrates which are inert to the polymer to aid in the impregnation of the dye into the granules without affecting the appearance of the polymer. This method, although an improvement over the Bianco process, also fails to provide a satisfactory method of producing an expanded styrene polymer product in which a dye is uniformly distributed throughout the product.

It has now been discovered that the disadvantages of the processes used heretofore in the dyeing of expandable styrene polymer particles may be overcome and expandable styrene polymer particles may be produced which are evenly dyed throughout by a process in which an organic, polystyrene dissolving compound, hereinafter referred to as a dyeing adjuvant, is used which enables the dye to pass through the surface of the particles so that it can diffuse evenly throughout the interior of the particles. The dyeing adjuvant is an aromatic compound, such as benzene or an alkyl, alkenyl or halogen substituted benzenoid compound. As noted above, the surface of styrene polymer granules resists penetration by dyes because of the presence of a difficultly penetrable polymeric layer or skin on the surface of the granules. Although the theory of operation of the invention has not been definitely established and nothing disclosed herein is to be construed as binding as to such theory, it appears that the organic compounds used as dyeing adjuvants swell and soften the polymeric skin or otherwise render it permeable to the dye thereby permitting the dye to pass through the surface layer of the polymeric granules and to diffuse evenly throughout their interior. In any event expandable styrene polymer granules when dyed by the process of this invention have a uniform color throughout their interior.

The term styrene polymer as used herein includes homopolymers of styrene and copolymers of styrene and a minor amount of one or more other ethylenically unsaturated compounds which do not interfere with the dyeing process of the invention. Examples of ethylenically unsaturated compounds which may be copolymerized with styrene are other vinyl aromatic monomers, such as alpha-methylstyrenes, vinyltoluene, divinylbenzene etc.; conjugated dienes, such as butadiene, isoprene, etc.; and other ethylenically unsaturated monomers, such as isobutylene, acrylonitrile, methylmethacrylate, etc. In addition, small amounts of polymerized materials may be added to the styrene monomer prior to or during its polymerization. Examples of such materials are natural rubber; synthetic rubbery polymers and copolymers such as polybutadiene, butyl rubber, etc.; and other polymeric materials which do not hinder the dyeing process of the invention, such as butadiene-styrene copolymers, styrene-acrylonitrile copolymers, butadiene-acrylonitrile copolymers, etc.

SUMMARY OF THE INVENTION

The process of the invention is as follows: The expandable styrene polymer particles, dye and dyeing adjuvant are suspended in a aqueous medium in a closed vessel, preferably by the use of an aqueous suspending agent. The suspension is heated to a temperature of about 160° to about 285° F. and maintained at that temperature until the dye has passed through the surface of the particles and has diffused uniformly throughout the interiors thereof. After the dye has uniformly distributed itself throughout the granules the dyeing is completed and the temperature is then reduced to below the heat distortion point of the polymer being dyed and the vessel is vented to reduce the pressure to atmospheric. The dyeing adjuvant and the dye may be added together or separately to the suspension and it is immaterial whether the dye or the dyeing adjuvant is added first. The suspension is maintained either at the autogenous pressure of the system or it may be maintained at superautogenous pressures by the injection of nitrogen or other inert gases into the closed vessel.

DESCRIPTION OF THE INVENTION

The expandable styrene polymer granules used in the invention are generally in the form of beads and contain an expanding or blowing agent which is preferable a low molecular weight aliphatic hydrocarbon, such as butane, pentane, or hexane, of which normal pentane is preferred. The blowing agent is normally present in an amount of from about 3 to about 15 percent by weight of the styrene polymer.

Conventional suspending agents can be used to suspend the expandable styrene polymer beads in the aqueous medium. Typical conventional suspending agents are tricalcium diphosphate, calcium hydroxide, potassium persulfate, polyvinyl alcohol, hydroxyethyl cellulose, ammonium polyacrylate, hydroxyapatite, bentonite, and the like, and they may be used alone or in combination. Anionic surface active agents may also be used as suspending agents. Suitable anionic surface active agents include fatty acid surfactants, aromatic carboxylic acid surfactants, aromatic and aliphatic organic sulfates and sulfonates, such as sodium and potassium beta-naphthalene sulfonates, sodium and potassium dodecylbenzene sulfonates, sodium and potassium stearates, sodium and potassium caprolates, sodium and potassium lauryl sulfates, and the like. Any effective small amount of one or more of the suspending agents and anionic surfactants can be used, ordinarily about 0.002 to about 6.0 percent of a suspending agent or anionic surfactant, based on the weight of the water of the suspension, being sufficient.

In general, any organic, water-insoluble, oil-soluble dye is suitable for use in the invention. Typical useful dyes are the azo, anthraquinone, azine, and quinoline dyes. Specific dyes and their color indices and colors which have been found suitable are presented below in tabular form:

| Dye | Color Index | Color |
| --- | --- | --- |
| Solvent Yellow 2 | 11020 | Yellow |
| Solvent Yellow 14 | 12055 | Yellow |
| Solvent Yellow 33 | 47000 | Yellow |
| Solvent Orange 7 | 12140 | Orange |
| Solvent Green 3 | 61565 | Green |
| Solvent Red 24 | 26105 | Red |
| Solvent Red 26 | 26120 | Red |
| Vat. Red 1 | 73360 | Pink |
| Disperse Red 9 | 60505 | Pink |
| Disperse Blue 7 | 62500 | Light Blue |
| Disperse Blue 22 | 60715 | Dark Blue |
| Solvent Blue 7 | 50400 | Blue |
| Solvent Violet 13 | 60725 | Violet |
| Solvent Violet 14 | 61705 | Violet |
| Solvent Blue 59 (1,4-diethylaminoanthraquinone) | | Blue |

Any amount of dye effective to produce the desired results can be used, the usual concentration range being about 0.005 to about 5.0 percent, by weight of the styrene polymer. If it is desired that the polymer be colored a lighter shade, a smaller amount of dye is used. The maximum depth of color obtainable by the use of suitable dyes is generally obtained by the use of an amount within the given range. An amount of dye greater than about 5 percent, based on the weight of the styrene polymer, usually does not produce any additional deepening of color.

The organic compounds used as dyeing adjuvants in the invention are liquid aromatic compounds such as benzene; mono-, di-, or tri-alkylated benzenes, such as toluene, xylene, and the tri-methylbenzenes, methylethyl benzene, methylisopropylbenzene and the like; alkenyl benzenes, such as styrene, alpha-methylstyrene, and styrenes which contain alkyl constituents on the benzene ring; halogenated benzene compounds, such as mono-, di-, and tri-chlorobenzene; and alkyl substituted benzenes which contain a halogen substituent on the benzene ring. The preferred dyeing adjuvants are toluene and the xylenes and other aromatic compounds which boil considerably above the softening point of the styrene polymer. These are preferred because they will not vaporize and contribute to the polymer expansion while the products are being molded and then condense while the polymer is still soft. This undersired vaporization and condensation of the dyeing adjuvant would tend to create a partial vacuum within the expanded polymer granules and subject the product to possible collapse before it cools sufficiently to be self-supporting. The amount of dyeing adjuvant agent which may be used in the invention is about 0.05 to about 0.35 percent by weight of the styrene polymer, the preferred amount being in the range of from about 0.08 to about 0.2 percent, based on the weight of the polystyrene. If the amount of dyeing adjuvant is less than about 0.05 percent the dye does not diffuse to the center of the beads so that the centers are white or only slightly colored. If the amount is greater than about 0.35 percent the granules tend to become excessively softened and so sensitive to heat that they perform unsatisfactorily in preexpansion and molding procedures.

The dyeing process is carried out in a vessel which is hermetically sealed. As mentioned above the precess is carried out under pressure which may be autogenous or superautogenous. In the latter case, nitrogen or any other inert gas, such as helium or argon, is injected into the sealed vessel before the heating period. The reaction vessel is equipped with an agitator which provides sufficient agitation to prevent the beads from settling out and maintains the suspension in a homogenous state.

The temperature of the suspension is brought slowly to about 160° to about 285° F. and maintained at the temperature until substantially all of the dye has been taken up by the beads. This is accomplished in a period of from about 3 to about 8 hours depending on the temperature of the suspension. The preferred temperature range of the precess is about 190° to about 240° F. at which range dyeing is complete in about 4 to about 6 hours. The dyeing process may be carried out completely at one temperature or it may be conducted for a period of time at a first temperature and then completed at a higher temperature. A particularly preferred heating cycle consists of a heating period at about 200° F. for about 2 hours followed by a heating period at about 230° F. for about 4 hours. If the temperature is at or below about 160°, the dyeing process is undesirably slow; e.g., after a period of 12 hours at this temperature some of the dye is not taken up by the styrene polymer granules and the granules show crocking and have centers which are lighter in color than the area adjacent the surface of the granules. If the temperature is higher than about 285° F., special equipment must be used to insure against leaks because of the high pressure produced.

After the heating period, the reaction mixture is allowed to cool to a temperature below the heat distortion point of the styrene polymer. This can vary between about 125° and about 205° F., depending upon the composition of the polymer being dyed. The vessel is then opened and the polystyrene granules are separated, washed, and dried. Almost all of the dye is absorbed into the granules so that at the end of the dyeing process, the aqueous suspending medium contains substantially no unabsorbed dye.

The expandable styrene polymer particles generally do not lose an appreciable amount of expanding agent during the dyeing process. However, it is preferred that the vessel used in the dyeing process be filled with the suspension to the fullest extent of its operating capacity so that at least about nine-tenths of the volume of the vessel is filled by the suspension.

If it is desired to add additional expanding agent to the expandable polystyrene particles, this may be done either before the dyeing process is started or after the dyeing adjuvant has altered the surface of the polymer granules. Blowing agent should not be added with the dyeing adjuvant or before it has had time to react with the polymer surface. If a substantial amount of blowing agent is present in the reaction medium when the dyeing adjuvant is added to the system or if blowing agent is added to the system while the dyeing adjuvant is in the reactor but before it has combined with the polymer granules and thereby rendered them more receptive to the dye the dyeing adjuvant does not perform satisfactorily. It appears that the blowing agent dilutes the dyeing adjuvant so that it cannot sufficiently disrupt the surface layer of the styrene polymer granules with the result that all of the dye is not absorbed uniformly into the polymer granules.

In the preferred embodiment of the invention the dye is added, without the simultaneous addition of blowing agent, to the suspension prior to, concurrently with, or shortly after the addition of the dyeing adjuvant. In a second embodiment the dyeing adjuvant is added alone to the suspension and allowed to intermix with the polymer granules for a sufficient period of time to modify the surface of the polymer granules after which the dye and an organic blowing agent are added to the suspension. The ingress of the blowing agent into the polymer granules can then accelerate the diffusion of the dye throughout the polymer granules. The dye and blowing agent can be added separately to the system or the dye can be dissolved in the blowing agent and the solution added to the suspension.

The invention is further illustrated by the following examples in which parts are by weight.

EXAMPLE 1

A reaction vessel equipped with an agitator, thermometer, and inlet port was charged with 90 parts of water and 100 parts of expandable polystyrene beads containing 7.7 percent by weight of normal pentane. Then 0.3 part of Calco Oil Blue N (Solvent Blue 59), a suspending agent comprised of 0.4 part of tribasic calcium phosphate, 0.0065 part of calcium hydroxide, and 0.0088 part of potassium persulfate, and a dyeing adjuvant consisting of 0.1 part of xylene were added. The volume of the space above the liquid level in the closed reactor was one-eighth the volume of the liquid. The vessel was sealed and the temperature of the suspension was raised to 200° F. and held at that temperature for 2 hours and then raised to 230° F. and held at that temperature for 4 hours. The contents of the vessel were cooled to just below 125° F. The cooled contents were poured into the wash tank, and the washed beads were dried. The suspension liquid was clear and did not show the presence of any dye. The dry beads were noncrocking and there was no significant loss of pentane from the beads. The dry beads were preexpanded and the preexpanded beads had a uniform brilliant blue color. The interiors of the preexpanded beads were the same color as the exteriors. The preexpanded beads were molded into blocks in conventional molding equipment. The molded blocks were of high quality with good diffusion and uniform color throughout.

EXAMPLE 2

The procedure of example 1 was repeated except that the expandable polystyrene beads initially contained 6.1 percent by weight of pentane and after the heating period of 200° F. for 2 hours and 230° F. for 4 hours, 1.6 percent pentane, based on the weight of the expandable polystyrene beads, was injected into the vessel through the inlet port and the temperature was thereafter maintained at 230° F. for an additional 2 hours. The quality of the washed and dried beads was substantially the same as that of the beads prepared according to example 1.

EXAMPLE 3

The procedure of example 1 was repeated except that the expandable polystyrene beads initially contained 6.1 percent pentane and 1.6 percent by weight of pentane, based on the weight of the expandable polystyrene beads, was introduced into the vessel before the heating was begun. After introduction of the pentane, the temperature of the suspension was raised to 220° F. and maintained thereat for 3 hours. The contents of the vessel were then cooled to room temperature and the vessel was vented so that the pressure therein was reduced to atmospheric pressure. The dyeing adjuvant and dye were added and the contents of the vessel were subjected to the same heating treatment as in example 1. The quality of the finished product was substantially the same as the quality of the product of example 1.

EXAMPLE 4

The procedure of example 1 was repeated except that 0.75 percent by weight pentane was added at the same time the xylene and dye were added. The preexpanded beads had white centers which shows that there was incomplete diffusion of the dye into the beads.

The results of this example show that the simultaneous addition of a blowing agent and dyeing adjuvant reduces the effectiveness of the dyeing adjuvant.

EXAMPLE 5

The procedure of example 1 was repeated except that the heating period was maintained for 6 hours at 220° F. The beads produced by this example were equal in quality to the beads produced by example 1.

EXAMPLE 6

Four dyeing runs were made according to the procedure of example 1 except different dyeing adjuvants are used. In the first run 0.1 part of trimethylbenzene was used; in the second run 0.1 part of styrene monomer was used; in the third run 0.1 part of chlorobenzene was used; and in the fourth run 0.1 part of para-methylstyrene was used.

The washed and dried beads prepared by the four runs of this example were equal in quality to the beads prepared according to example 1.

EXAMPLE 7

The procedure of example 1 was repeated except that after the vessel containing the suspension of expandable polystyrene beads, the dyeing adjuvant and the dye was sealed, a sufficient amount of nitrogen was introduced through the inlet port to raise the pressure within the vessel to 15 p.s.i.g.

The expandable polystyrene beads prepared according to this example were equal in quality to the beads prepared according to example 1.

Numerous modifications of this invention which are not specifically mentioned herein will be readily apparent to those familiar with the preparation of dyed expandable polystyrene particles and such modifications may be adopted without departing from the spirit and scope of this invention.

We claim:

1. A process for dyeing expandable styrene polymer particles comprising: suspending the particles in an aqueous medium in a closed system; adding to the suspension about 0.05 to about 0.35 percent based on the weight of the styrene polymer, of a dyeing adjuvant selected from the class consisting of benzene, mono-, di-, and tri-lakylated benzenes, alkenyl and alkylated alkenyl benzenes, mono-, di-, and tri-halogenated benzenes, and halogenated alkyl and alkenyl benzenes; adding to the suspension a water insoluble, organic solvent-soluble dye; maintaining the suspension at a temperature of about 160° to about 285° F. and autogenous pressure or higher until the dye is substantially completely absorbed by the expandable styrene polymer particles; cooling the suspension to below the heat distortion point of the polymer; and separating the dyed expandable styrene polymer particles from the aqueous medium.

2. A process according to claim 1 wherein the dye is present in an amount of about 0.005 to about 5.0 percent based on the weight of the polymer.

3. A process according to claim 2 wherein the dyeing adjuvant is present in an amount of about 0.1 to about 0.2 percent based on the weight of the polymer.

4. A process according to claim 2 wherein the dye is added to the suspension after the addition of the dyeing adjuvant.

5. A process according to claim 2 wherein the dyeing adjuvant is xylene.

6. A process according to claim 2 in which the heating cycle comprises a heating period at about 200° for about 2 hours followed by a heating period at about 230° F. for about 4 hours.

7. A process according to claim 2 in which the heating cycle comprises a period of about 6 hours at about 220° F.

8. A process according to claim 2 wherein the pressure of the system is raised to at least 15 p.s.i.g. by the addition of an inert gas.

9. A process according to claim 2 wherein the temperature is maintained at about 190° to about 240° F. during the dyeing step.

10. A process according to claim 2 wherein additional blowing agent is added to the dyed expandable styrene polymer particles by adding blowing agent to a suspension of the dyed particles and maintaining the suspension at a temperature of about 200° to about 230° F. and autogenous pressure or higher for a period of about 3 to about 4 hours.

11. A process according to claim 2 wherein the dyeing adjuvant is present in an amount of about 0.08 to about 0.20 percent, based on the weight of the styrene polymer.

12. In a process for dyeing expandable styrene polymer granules by suspending, in an aqueous medium contained in a closed system, the granules, about 0.01 to about 5 percent of a water-insoluble, organic solvent-soluble dye and about 0.5 to about 15 percent of an organic blowing agent, said percentages being based on the weight of the polymer, and maintaining said suspension at a temperature of about 160° to about 285° F. and at the autogenous pressure of the system or higher until the dye is absorbed into said granules, the improvement consisting of adding to the suspension, prior to the addition of the dye and the blowing agent, about 0.05 to about 0.35 percent, based on the weight of the polymer, of a liquid aromatic compound selected from the class consisting of benzene, mono-, di-, and tri-alkylated benzenes, alkenyl and alkylated alkenyl benzenes, mono-, di-, and tri-halogenated benzenes, and halogenated alkyl and alkenyl benzenes.

* * * * *